United States Patent
Kumar et al.

(10) Patent No.: US 12,411,969 B2
(45) Date of Patent: Sep. 9, 2025

(54) ON SCREEN DATA PROTECTION USING CAMERA AND NARROW ARTIFICIAL INTELLIGENCE

(71) Applicant: Bank of America Corporation, Charlotte, NC (US)

(72) Inventors: Abhay Kumar, Haryana (IN); Navin R Poojari, Mumbai (IN); Kapil Sudhir Karkhanis, Mumbai (IN); Syed Luqman Ahmed, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 18/239,261

(22) Filed: Aug. 29, 2023

(65) Prior Publication Data

US 2025/0077693 A1 Mar. 6, 2025

(51) Int. Cl.
*G06F 21/62* (2013.01)
(52) U.S. Cl.
CPC .................. *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 9,081,917 B2 | 7/2015 | Currin et al. | |
| 9,898,619 B1* | 2/2018 | Hadsall | G06F 21/6245 |
| 10,722,180 B2 | 7/2020 | Zhang et al. | |
| 10,810,310 B2 | 10/2020 | Prvulovic et al. | |
| 11,397,956 B1* | 7/2022 | Eidam | G06F 3/04883 |
| 11,445,378 B2 | 9/2022 | Montalvo et al. | |
| 11,461,436 B1* | 10/2022 | Balmakhtar | G06F 21/6245 |
| 11,640,470 B1* | 5/2023 | Amar | G06Q 10/0635 726/22 |
| 12,242,580 B1* | 3/2025 | Philbrick | G06F 21/84 |
| 2015/0302207 A1* | 10/2015 | Sprenger | G06F 21/55 726/26 |

(Continued)

FOREIGN PATENT DOCUMENTS

| | | |
|---|---|---|
| AU | 2014241282 | 10/2014 |
| JP | 2020192676 | 12/2020 |

*Primary Examiner* — Jason Chiang
(74) *Attorney, Agent, or Firm* — Weiss & Arons LLP

(57) ABSTRACT

Methods, apparatus, and systems are provided for using narrow artificial intelligence ("AI") to detect and secure confidential data. The methods may include using a camera on a user computer to capture a live camera feed of an area adjacent to the user computer. Methods may include identifying one or more unverified data elements in the captured data. In response to determining an unverified data element, methods may include securing the user computer. Methods may include capturing a screenshot of the user computer screen. Methods may include transmitting data extracted from the screenshot through an object identification algorithm. Methods may include identifying confidential data within the screenshot using a pattern analysis model. Methods may include recreating the screenshot using a narrow AI model. Methods may include blurring the confidential data in the recreated screenshot. Methods may include overwriting the screenshot to display the recreated screenshot on the user computer.

20 Claims, 6 Drawing Sheets

(56) References Cited

U.S. PATENT DOCUMENTS

| | | | |
|---|---|---|---|
| 2016/0132721 A1* | 5/2016 | Bostick | G06F 21/60 |
| | | | 382/118 |
| 2018/0033171 A1* | 2/2018 | Rakshit | G06V 20/00 |
| 2018/0300510 A1* | 10/2018 | Lam | G06F 21/6245 |
| 2018/0357440 A1* | 12/2018 | Brady | H04L 63/08 |
| 2019/0180664 A1* | 6/2019 | Sun | G06F 21/84 |
| 2019/0213498 A1 | 7/2019 | Adjaoute | |
| 2020/0143481 A1 | 5/2020 | Brown et al. | |
| 2021/0374275 A1* | 12/2021 | Singh | G06F 16/538 |
| 2022/0188455 A1* | 6/2022 | Mukherjee | G06F 21/6254 |
| 2023/0105954 A1 | 4/2023 | Putnam | |
| 2023/0186534 A1* | 6/2023 | Doken | G06T 9/00 |
| | | | 345/633 |
| 2023/0222212 A1* | 7/2023 | Mullins | G06F 21/51 |
| | | | 726/26 |
| 2023/0244823 A1* | 8/2023 | Iyer | G06F 21/6245 |
| | | | 726/26 |
| 2024/0248975 A1* | 7/2024 | Kozlowski | G06F 21/64 |
| 2024/0264847 A1* | 8/2024 | Swierk | G06F 9/44505 |
| 2024/0264885 A1* | 8/2024 | Hamlin | G06F 9/542 |
| 2024/0265105 A1* | 8/2024 | Swierk | G06F 21/57 |
| 2024/0275926 A1* | 8/2024 | Hamlin | G06F 21/84 |
| 2024/0289498 A1* | 8/2024 | Kondapi | G06F 21/84 |

\* cited by examiner

ON SCREEN DATA PROTECTION USING CAMERA AND NARROW ARTIFICIAL INTELLIGENCE

FIELD OF TECHNOLOGY

The field of technology relates to artificial intelligence.

BACKGROUND OF THE DISCLOSURE

Recently, working remotely has become more mainstream. Working remotely generally allows employees to access confidential data from the employee's homes. An employer may want to ensure that the confidential data remains secure. However, working remotely may compromise the security of the confidential data. Specifically, working remotely may enable unauthorized personnel, such as other members of the employee's home, to gain access to the confidential data. Additionally, working remotely may also enable the unauthorized personnel to execute unauthorized capturing of the confidential data through another device.

Therefore, it would be desirable to provide a system to protect confidential data from unauthorized personnel. It would be further desirable to provide a system to restrict on-screen image capturing of such confidential data.

SUMMARY OF THE DISCLOSURE

Systems, apparatus and methods for using narrow artificial intelligence to detect and secure confidential data are provided. The methods may include using a camera. The camera may be any suitable device for recording visual images. The camera may be connected to a user computer. The camera may be located on the user computer. The camera may be physically fixed to the computer. The camera may be wirelessly attached to the computer. The camera may be built in to the computer.

The user computer may be a computing device. The user computer may include a smartphone, tablet, desktop, laptop, mainframe computing device or any other suitable computing device. The user computer may include a screen. The screen may be a display monitor. The screen may be any suitable display that displays output of a processor to a user.

The methods may include using the camera to capture a live camera feed. The live camera feed may capture an area in front of the user computer screen. The live camera feed may capture an area adjacent to the user computer screen. The live camera feed may capture any suitable area around the user computer screen.

The methods may include transmitting the captured live camera feed to a database. The database may be a private database. The database may be a secure database. The database may include a processor. The processor may include hardware. The processor may include software. The processor may process the live camera feed.

The methods may include pre-processing the live camera feed. The pre-processing may include categorizing data captured in the live camera feed. The output of the categorizing may be categorized data. The data may be categorized into a plurality of categories. The plurality of categories may include area detected, color, distance, resolution and/or any other suitable category. As such, the data may be categorized by area detected, color, distance, resolution and/or any suitable category.

The methods may include identifying various data elements within the categorized data. The methods may include identifying one or more unverified data elements within the categorized data. The one or more unverified data elements may include an unauthorized user. The one or more unverified data elements may include artificial light. The one or more unverified data elements may include an unauthorized computing device. The one or more unverified data elements may include any suitable unverified data elements. A data element may be identified as an unverified data element using a machine learning algorithm.

The methods may include identifying one or more verified data elements in the categorized data. One or more verified data elements may include an authorized user. One or more verified data elements may include an authorized computing device. One or more verified data elements may include any suitable verified data elements. A data element may be identified as a verified data element using the machine learning algorithm.

The methods may include using an image recognition algorithm. The image recognition algorithm may detect unverified data elements. The methods may include storing, at the database, a facial recognition profile for one or more verified users. The methods may include comparing data captured in the live camera feed to a stored facial recognition profile of one of the one or more verified users. The comparing may identify whether the user is or is not a verified user.

The methods may include detecting an unverified user on the camera. The methods may include capturing, using the camera, a facial recognition profile of the unverified user. The methods may include comparing the facial recognition profile of the unverified user with the facial profile of the user.

The methods may include labeling the captured facial recognition profile of the unverified user as an unverified data element. The captured facial recognition profile of the unverified user may be labeled as an unverified data element when the facial recognition profile fails to be similar, over a threshold of similarity, with a stored facial recognition profile of a verified user. The methods may include storing the facial recognition profile of the unverified user as a unverified data element when the captured facial recognition profile is labeled as an unverified data element.

The methods may include determining a security-breach score for each unverified data element. The security-breach score may be a score representing a possibility for confidential data to incur exposure to an entity operating an unverified data element. Confidential data may include customer specific data, such as credit card information, identification information and/or any other suitable confidential customer specific information. Confidential data may include entity specific data, such as entity related financial information, entity related identification information and/or any other suitable entity related confidential information. Confidential information may include any information that is not available for the public.

The security-breach score may be a numeric value. Each unverified data element may be assigned a different security-breach score. The methods may include labeling each unverified data element with the determined security-breach score. The labeling may include tagging a metadata set for each unverified data element with the corresponding security-breach score.

For example, an unverified data element labeled with a relatively low security-breach score may indicate that it is not likely that an entity operating an unverified data element is able to access the confidential data. An unverified data element labeled with a relatively high security-breach score may indicate that it is more likely that an entity operating an unverified data element is able to access the confidential data.

The methods may include determining if the determined security-breach scores for each of the unverified data elements are greater than a predetermined security-breach score. The predetermined security-breach score may be a threshold security-breach score. The predetermined security-breach score may be a maximum security-breach score that indicates that it is considered not likely for an entity operating an unverified data element is able to access the confidential data. Security-breach scores greater than the predetermined security-breach score may identify a range of security-breach scores that indicate that it is more likely that an entity operating an unverified data element is able to access the confidential data.

The methods include securing the user computer screen. The methods may include securing the user computer screen in response to determining that an unverified data element is labeled with a security-breach score that is greater than the predetermined security-breach score. Securing the computer screen may include capturing a screenshot of the user computer screen. The methods may include using the camera to capture a screenshot of the user computer screen. The methods may include using any suitable screen capture software to capture a screenshot of the user computer screen. The methods may include using any suitable screen capture hardware to capture a screenshot of the user computer screen.

The methods may include extracting data from the screenshot. The screenshot may include a document. The document may be displayed on the user computer screen. The document may include data. The data may include confidential data.

The method may include cleaning the data. Cleaning the data may include identifying malicious data within the data. Cleaning the data may include removing the malicious data from the data.

The methods may include transmitting the extracted data to an object identification algorithm. The object identification algorithm may include one or more deep learning algorithms. Deep learning algorithms may utilize neural networks. Neural networks may use interconnected nodes or neurons in a layered structure to analyze data and predict outcomes. The object identification algorithm may include a mathematical formula. The mathematical formula may identify the data and convert it into numeric values.

The object identification algorithm may include an input layer. The input layer may determine data values corresponding to the extracted data from the screenshot. The input layer may include a series of questions relating to the data. For example, the input layer may be used to determine whether the signals relating to the data are in a correct format. The input layer may be used to determine if wavelengths of light captured are in red, green, blue ("RGB") format. The input layer may determine if there are any other signals other than the wavelengths of lights. The input layer may determine any other suitable information relating to the data.

The input layer may produce a binary response. The binary response may relate to the answer determined for each of the series of questions relating to the data. The input layer may produce a binary response of zero if the answer is determined to be no. The input layer may produce a binary response of one if the answer is determined to be yes. For example, in response to determining that the signals are in the correct format, the input layer may output a data value of one. In response to determining that the signals are not in the correct RGB format, the input layer may output a data value of zero. The input layer may output a data value of one in response to determining that there are no other signals, other than the wavelengths of lights.

The object identification algorithm may include a pattern layer. The pattern layer may receive the determined data values from the input layer. The pattern layer may determine a pattern of the data values. The pattern layer may be trained using testing and training sets. The pattern layer may be trained to identify patterns within data values. The pattern layer may output a pattern from the inputted data values.

The object identification algorithm may include a summation layer. The summation layer may receive the pattern of data values output by the pattern layer. The summation layer may determine an output signal for the pattern of data values. The summation layer may average the output signal from the pattern of data values. The summation layer may scale the output signal.

The object identification algorithm may include an output layer. The output layer may output the output signal. The output signal may be transmitted to a data classification model. The data classification model may include classification algorithms. The classification algorithms may ingest the data. The classification algorithms may analyze the ingested data. The classification algorithms may analyze the ingested data for correlations and patterns within the data. The classification algorithms may use the analyzed correlations and patterns to make predictions. The data classification model may update the classification algorithms based on the predictions curated from the analyzed correlations and patterns.

The data classification model may identify pixel values corresponding to each of the data values included in the output signal. The data classification model may segment the data values based on the identified pixel values for each data value. The data classification model may determine which pixel values should be included in each segment.

The data classification model may analyze the segmented data values to identify data specific features for each data value segment. Data specific features may include location corresponding to pixel values, color corresponding to pixel values, resolution corresponding to pixel values and/or any other suitable data specific features. The data classification model may label the data value segments according to the identified data specific features. The data value segments may be labeled as a color, object, location and/or any other suitable identifiable feature.

The methods may include recreating the screenshot. The screenshot may be recreated using a narrow artificial intelligence ("AI") model. The narrow AI model may be programmed to attend one task at a time. The narrow AI model may attend one task at a time by pulling in information from a specific dataset. The narrow AI model may include a goal-oriented version of an AI model. The goal-oriented version of the narrow AI model may be designed to perform a single task. The narrow AI model may be used for image creation.

The narrow AI model may include a processing unit. The processing unit may provide processing capabilities to the narrow AI model. The processing unit may be a central processing unit ("CPU"). The processing unit may be a graphical processing unit ("GPU"). The processing capabilities may be used by the narrow AI model to perform processing and computing functions.

The narrow AI model may be trained by receiving a specified dataset. The specified dataset may include data relating to image creation. The narrow AI model may operate within a predetermined range. The narrow AI model may operate within a predefined range. The narrow AI model may be trained to recreate images from the given data value segments.

The narrow AI model may learn from experience via iterative processing and algorithmic training. The narrow AI model may include progressive learning algorithms. The progressive learning algorithms may ingest the specified dataset. The progressive learning algorithms may analyze the ingested specified dataset. The progressive learning algorithms may analyze the data value segments for correlations and patterns within the data value segments. The progressive learning algorithms may use the analyzed correlations and patterns to create an image from the data value segments. The narrow AI model may update the progressive learning algorithms based on the predictions curated from the analyzed correlations and patterns. A combination of the data, the predictions and/or the progressive learning algorithm may be used to dynamically program the narrow AI model.

The narrow AI model may test and measure the accuracy of generated outputs. By providing the narrow AI model with specific training and testing datasets, the narrow AI model may measure the accuracy of the generated output by comparing the generated outputs to the specific training and testing datasets. Based on comparing the generated outputs to the labeled training and testing datasets, the narrow AI model may update the progressive learning algorithms to provide a more accurate performance. The narrow AI model may improve predictions by using the specific training and testing datasets. The training of the narrow AI model may be dynamically updated using testing and training sets.

The narrow AI model may include machine learning algorithms. Machine learning algorithms may enable the narrow AI model to learn from experience without specific instructional programming. The narrow AI model may include deep learning algorithms. Deep learning algorithms may utilize neural networks. Neural networks may use interconnected nodes or neurons in a layered structure to analyze data and predict outcomes. The narrow AI model may include natural language processing ("NLP"). NLP may enable the narrow AI model to recognize, analyze, interpret and understand written and/or spoken human language. The narrow AI model may include any other suitable algorithms or components.

The methods may include transmitting the labeled data value segments to the narrow AI model. The methods may include using the identified correlations and patterns to convert the data value segments into pixels. The methods may include combining the converted pixels to recreate the screenshot.

The methods may include using the narrow AI model to identify confidential data within the recreated screenshot. The narrow AI model may develop, and use, a pattern analysis model to identify confidential data within the recreated screenshot.

In the event that no confidential information is identified within the recreated screenshot, the methods may include displaying an untampered view of the user computer screen. The methods may include holding the system until the screen of the user computer changes. In response to a change of the content displayed on the screen, the methods may include reidentifying whether there is confidential data displayed on the screen. The methods may include terminating the system in response to failing to identify confidential information on the computer screen.

In the event that confidential data is identified, the methods may include transmitting details relating to the confidential information to a security database. The security database may store confidential data. The security database may verify the confidentiality of the data.

In order to preserve the confidentiality of the data, the methods may include blurring the confidential data in the recreated screenshot. The methods may include using hypertext markup language ("HTML") to blur the identified confidential data. The methods may include using cascading style sheets ("CSS") to blur the identified confidential data. The methods may include using a combination of HTML and CSS to blur the identified confidential data.

The methods may include overwriting the screenshot of the data displayed on the user computer screen with the recreated screenshot. The methods may include displaying the recreated screenshot on the user computer screen.

The methods may include recording a user's activity on the user computer screen. The methods may include transmitting the recording of the user's activity to the database. The methods may include storing the user's activity at the database.

In response to a detection of new data displayed on the computer screen, the methods may include reanalyzing the data, creating a new screenshot and blurring confidential data identified in the new screenshot. The methods may include re-instantiating the system each time new data is displayed on the computer screen.

The methods may include maintaining the overwriting of the recreated screenshot when unverified data is detected by the camera. The methods may include removing the overwriting of the recreated screenshot when the camera fails to detect the unverified data.

The methods may include detecting that the camera is disabled on the user computer. In response to detecting that the camera is disabled on the user computer, the methods may include overwriting the user computer screen with a fully blurred image. The methods may include overwriting the user computer screen with a fully blurred image because the system may be unable to determine the viewers of the computer screen. In response to detecting that the camera is disabled on the user computer, the methods may include transmitting a message to the user computer. The message may instruct the user to enable the camera. In response to detecting that the camera is enabled, the methods may include removing the fully blurred image.

The methods may include capturing a video of a time period of activity on the user computer screen. The time period may be predetermined time period. The time period may be a set time period. The time period may be thirty seconds. The time period may be a minute. The time period may be five minutes. The time period may be an hour. The time period may be any suitable time period. The video may include a plurality of screenshots. The video may include screenshots of one or more of a plurality of documents, a plurality of applications and/or a plurality of folders.

The methods may include recreating the video. The methods may include blurring confidential data in each of the screenshots of one or more of the plurality of documents, the plurality of applications and/or the plurality of folders. The methods may include overwriting the user computer screen with the recreated video. The methods may include displaying the recreated video on the user computer screen.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
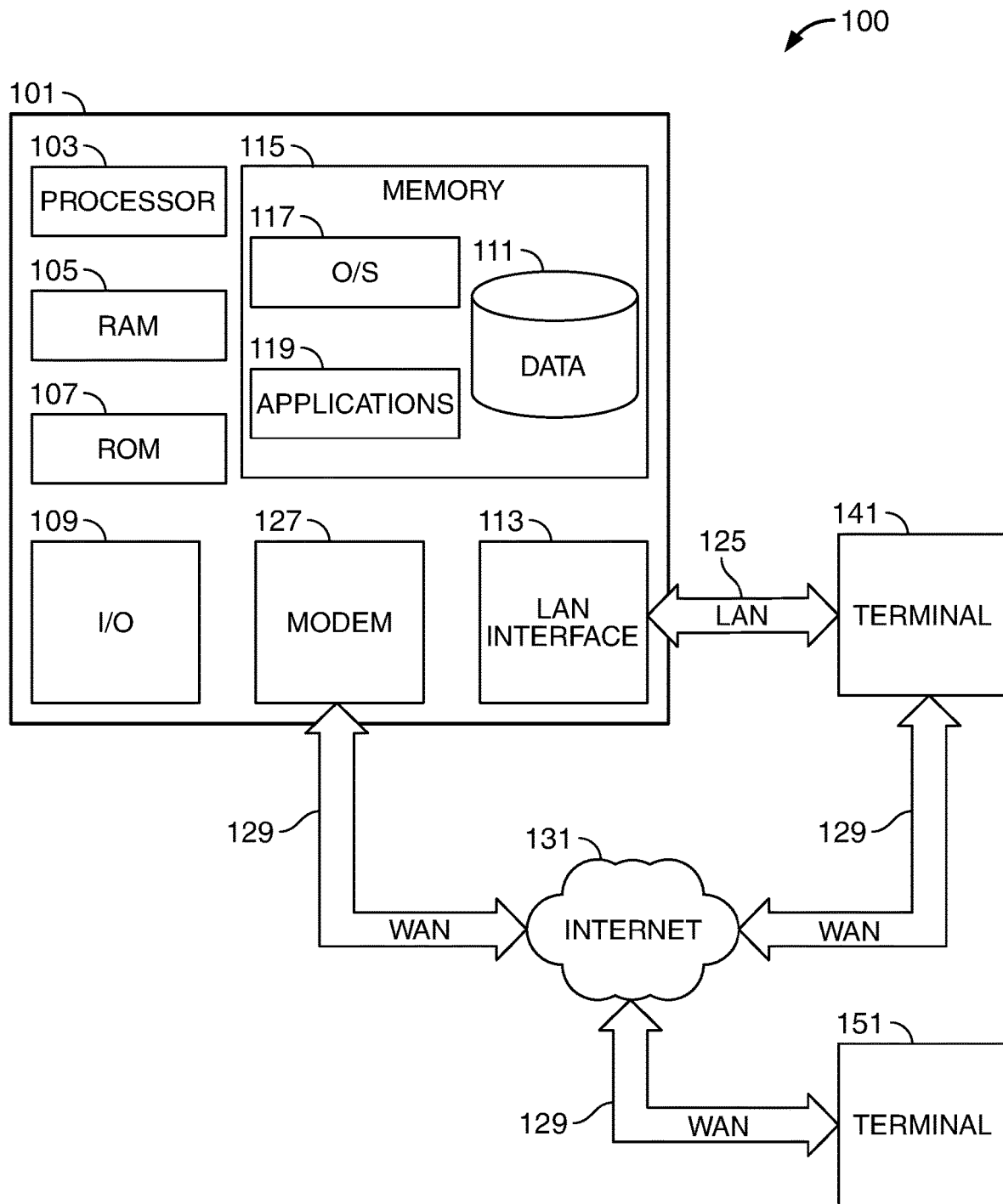
FIG. 1 shows an illustrative diagram in accordance with principles of the disclosure.

Apparatus, methods and systems for using narrow artificial intelligence ("AI") to detect and secure confidential data. The apparatus may include a processor.

The processor may include hardware. The processor may include software. The processor may provide instructions, processing power and processing capabilities.

The processor may be operating in tandem with a user computer. The user computer may be a tablet, desktop computer, laptop, smartphone, mainframe computer or any other suitable computing device. The user computer may be connected to a camera. The camera may be any suitable device for recording images. The camera may be fixedly attached to the computer. The camera may be removably attached to the computer. The camera may be wirelessly connected to the computer. The camera may be wired to the computer.

The camera may capture live camera feed in a space adjacent to the user computer. The camera may capture live camera feed in a space in front of the user computer. The camera may capture live camera feed in a space peripheral to the user computer.

The processor may pre-process the live camera feed. The processor may categorize data captured in the live camera feed into categorized data. The processor may categorize data by area detected, color, distance, resolution and/or any suitable category.

The processor may identify various data elements within the categorized data. The processor may identify one or more unverified data elements within the categorized data. Unverified data elements may include an unauthorized user. Unverified data elements may include an unidentified light source. Unverified data elements may include artificial light. Unverified data elements may include an unauthorized computing device. Unverified data may include any suitable unverified data elements. The processor may use a machine learning algorithm to label a data element as an unverified data element.

The processor may identify one or more verified data elements within the categorized data. Verified data elements may include an authorized user. Verified data elements may include identifiable light sources. Verified data elements may include authorized computing devices. Verified data elements may include any suitable verified data elements. The processor may use the machine learning algorithm to label a data element as a verified data element.

The processor may determine a security-breach score for each unverified data element. The security-breach score may be a score representing a possibility for confidential data to incur exposure to an entity operating an unverified data element. Confidential data may include customer specific data, such as credit card information, identification information and/or any other suitable confidential customer specific information. Confidential data may include entity specific data, such as entity related financial information, entity related identification information and/or any other suitable entity related confidential information. Confidential information may include any information that is not available for the public.

The security-breach score may be a numeric value. Each unverified data element may be assigned a different security-breach score. The security-breach scores may be determined using the machine learning algorithm. The processor may label each unverified data element with the determined security-breach score. The processor may tag a metadata set for each unverified data element with the corresponding determined security-breach score.

For example, an unverified data element labeled with a relatively low security-breach score may indicate that it is not likely that an entity operating an unverified data element is able to access the confidential data. An unverified data element labeled with a relatively high security-breach score may indicate that it is more likely that an entity operating an unverified data element is able to access the confidential data.

The processor may secure the user computer. The processor may secure the user computer in response to determining that an unverified data element is labeled with a security-breach score that is greater than a predetermined security-breach score. The predetermined security-breach score may be a maximum security-breach score. The maximum security-breach score may indicate that it is considered not likely for an entity operating an unverified data element to access the confidential data. Security-breach scores greater than the predetermined security-breach score may define a range of security-breach scores that indicate that it is more likely that an entity operating an unverified data element is able to access the confidential data.

The processor may capture a screenshot of the user computer. The processor may extract data from the screenshot. The processor may filter the data to remove malicious data from the screenshot. The processor may transmit the extracted data to an object identification algorithm.

The object identification algorithm may include one or more deep learning algorithms. Deep learning algorithms may utilize neural networks. Neural networks may use interconnected nodes or neurons in a layered structure to analyze data and predict outcomes. The object identification algorithm may include a mathematical formula. The mathematical formula may identify the data and convert it into numeric values.

The object identification algorithm may receive the extracted data from the processor. The object identification algorithm may include an input layer, a pattern layer, a summation layer, an output layer and any other suitable layer. The object identification algorithm may output a signal. The signal may include data values. The data values may be extracted from the data identified from the screenshot. The data values may be transmitted through the input layer, pattern layer, and summation layer. The object identification algorithm may transmit the output signal to a data classification model.

The data classification model may include classification algorithms. The classification algorithms may ingest the data. The classification algorithms may analyze the ingested data. The classification algorithms may analyze the ingested data for correlations and patterns within the data. The classification algorithms may use the analyzed correlations and patterns to make predictions. The data classification model may update the classification algorithms based on the predictions curated from the analyzed correlations and patterns.

The data classification model may receive the output signal from the object identification algorithm. The data classification model may identify a corresponding pixel value for each data value. The data classification model may segment the data values included in the output signal into segmented data values. The data classification model may segment the data values based on the identified pixel values for each data value. The classification model may analyze the segmented data values to identify data specific features for each data value segment. Data specific features may include color, resolution, location, saturation and/or any other suitable data specific features. The data classification model label the data value segments according to the identified data specific features.

The apparatus may include a narrow AI model. The narrow AI model may be programmed to do one task at a time. The narrow AI model may do one task at a time by pulling in information from a specific dataset. The narrow AI model may include a goal-oriented version of an AI model. The goal-oriented version of the narrow AI model may be designed to perform a single task. The narrow AI model may be used for image creation.

The narrow AI model may include a processing unit. The processing unit may provide processing capabilities to the narrow AI model. The processing unit may be a central processing unit ("CPU"). The processing unit may be a graphical processing unit ("GPU"). The processing capabilities may be used by the narrow AI model to perform processing and computing functions.

The narrow AI model may be trained by receiving a specified dataset. The specified dataset may include data relating to image creation. The narrow AI model may operate within a predetermined range. The narrow AI model may operate within a predefined range. The narrow AI model may be trained to recreate images from the given data value segments.

The narrow AI model may learn from experience via iterative processing and algorithmic training. The narrow AI model may include progressive learning algorithms. The progressive learning algorithms may ingest the specified dataset. The progressive learning algorithms may analyze the ingested specified dataset. The progressive learning algorithms may analyze the data value segments for correlations and patterns within the data value segments. The progressive learning algorithms may use the analyzed correlations and patterns to create an image from the data value segments. The narrow AI model may update the progressive learning algorithms based on the predictions curated from the analyzed correlations and patterns. A combination of the data, the predictions and/or the progressive learning algorithm may be used to dynamically program the narrow AI model.

The narrow AI model may test and measure the accuracy of generated outputs. By providing the narrow AI model with specific training and testing datasets, the narrow AI model may measure the accuracy of the generated output by comparing the generated outputs to the specific training and testing datasets. Based on comparing the generated outputs to the labeled training and testing datasets, the narrow AI model may update the progressive learning algorithms to provide a more accurate performance. The narrow AI model may improve predictions by using the specific training and testing datasets. The training of the narrow AI model may be dynamically updated using testing and training sets.

The narrow AI model may include machine learning algorithms. Machine learning algorithms may enable the narrow AI model to learn from experience without specific instructional programming. The narrow AI model may include deep learning algorithms. Deep learning algorithms may utilize neural networks. Neural networks may use interconnected nodes or neurons in a layered structure to analyze data and predict outcomes. The narrow AI model may include natural language processing ("NLP"). NLP may enable the narrow AI model to recognize, analyze, interpret and understand written and/or spoken human language. The narrow AI model may include any other suitable algorithms or components.

The narrow AI model may receive the labeled data value segments. The narrow AI model may identify pixel values corresponding to the data value segments. The narrow AI model may convert the data value segments into the corresponding pixel values. The narrow AI model may identify pixels that correspond to the identified pixel values. The narrow AI model may combine the pixels to recreate the screenshot.

The narrow AI model may develop and use a pattern analysis model to identify confidential data in the recreated screenshot. The narrow AI model may transmit a record of the identified confidential data to a security database. The narrow AI model may blur the confidential data in the recreated screenshot. The narrow AI model may use hypertext markup language ("HTML") to blur the identified confidential data. The AI model may use cascading style sheets ("CSS") to blur the identified confidential data. The AI model may use a combination of HTML and CSS to blur the identified confidential data.

The AI model may overwrite the screenshot of the data displayed on the computer screen to display the recreated screenshot. The AI model may display the recreated screenshot on the user computer screen.

The narrow AI model may maintain the overwrite of the recreated screenshot when unverified data is detected by the camera. The narrow AI model may remove the overwrite of the recreated screenshot when the camera fails to detect the unverified data.

The processor may capture a video of a time period of activity on the user computer. The video may include a plurality of screenshots. The video may include a plurality of screenshots of one or more of a plurality of documents, a plurality of applications and/or a plurality of folders.

The narrow AI model may recreate the video. The recreated video may include blurred confidential data in each of the screenshots of one or more of the plurality of documents, the plurality of applications and/or the plurality of folders. The narrow AI model may display the recreated video on the user computer screen.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the user computers, AI models, databases, algorithms and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. Memory 115 may also store videos, text and/or audio assistance files. User computers, the AI models, the databases, the algorithms, and any suitable computing device as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
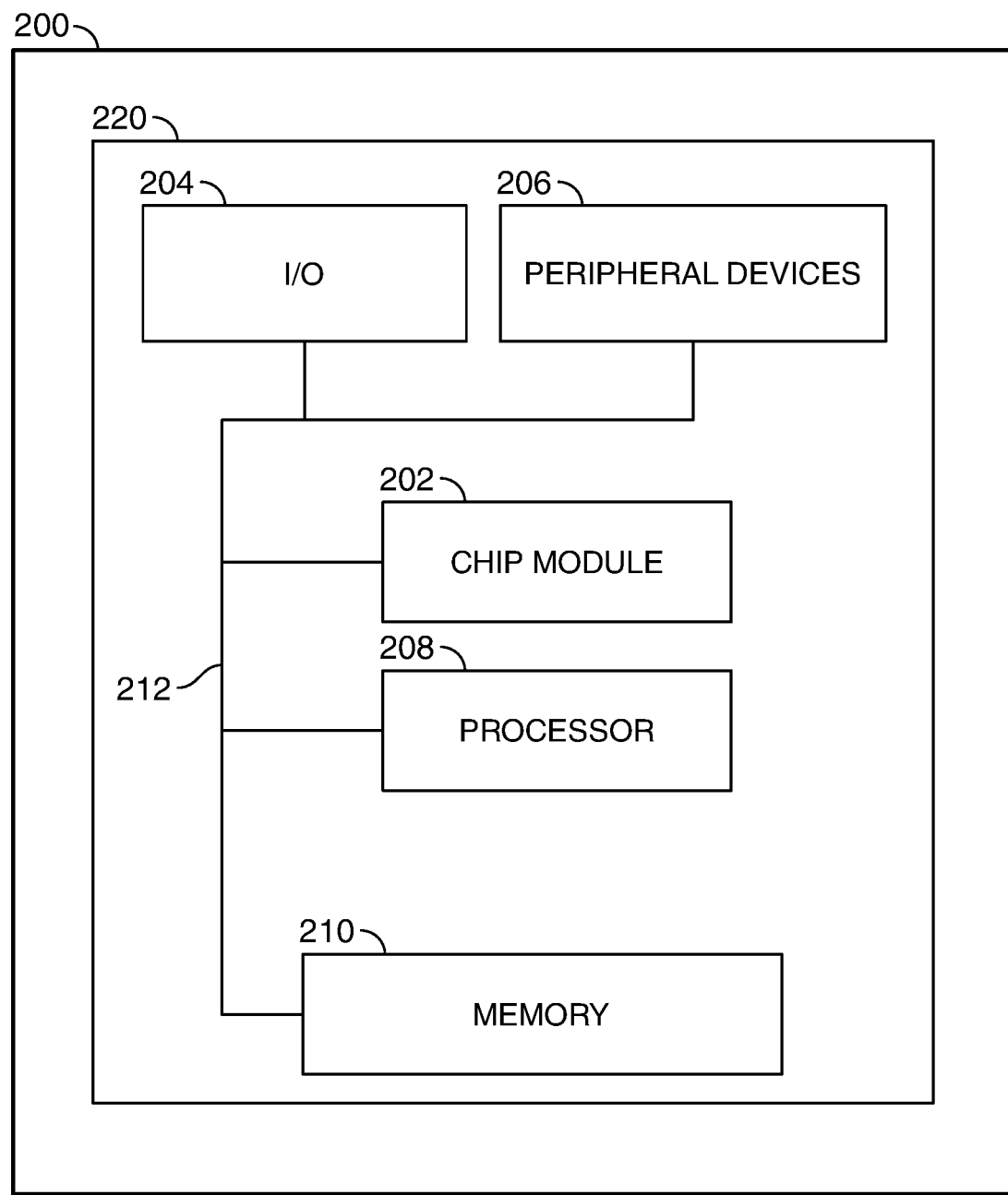
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
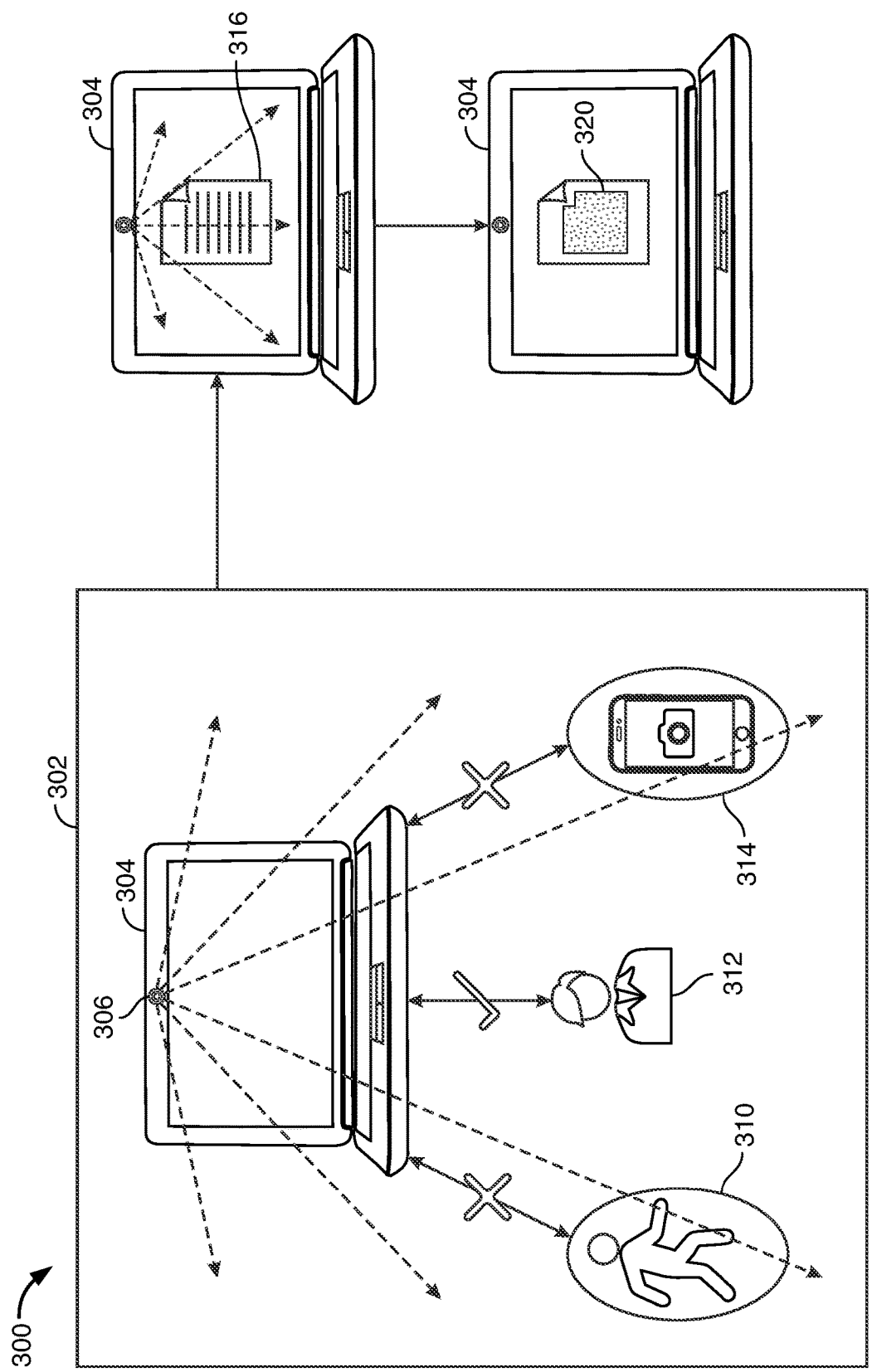
FIG. 3 shows yet another illustrative diagram in accordance with principles of the disclosure.

FIG. 3 shows illustrative system 300. System 300 may include user computer 304. User computer 304 may include one or more features in common with computer system 101 and chip 202 as shown in FIGS. 1 and 2. User computer 304 may be a computing device. User computer 304 may be a desktop computer, laptop, smartphone, tablet, mainframe computer or any other suitable computing device. User computer 304 may include camera 306. Camera 306 may be built into user computer 304. Camera 306 may be removably attached to user computer 304.

Camera 306 may capture live camera feed 302. Live camera feed 302 may capture an area adjacent to user computer 304. The captured area may be an area in front of user computer 304. Camera 306 may capture data in live camera feed 302. Camera 306 may capture user 312. Camera 306 may capture user 310. Camera 306 may capture phone 314.

User 312 may be determined, by user computer 304, to be an authorized user. User 310 may be determined to be an unauthorized user. Phone 314 may include an unauthorized camera. In response to determining the presence of user 310 or phone 314, user computer 304 may secure data 316 displayed on user computer 304. User computer 304 may capture a screenshot of data 316 displayed on user computer 304.

In response to determining the presence of user 310 or phone 314, user computer 304 may overwrite data 316 with data 320. Data 320 may be fully blurred data. Data 320 may be partially blurred data. Data 320 may be non-confidential data.

Figure 4:
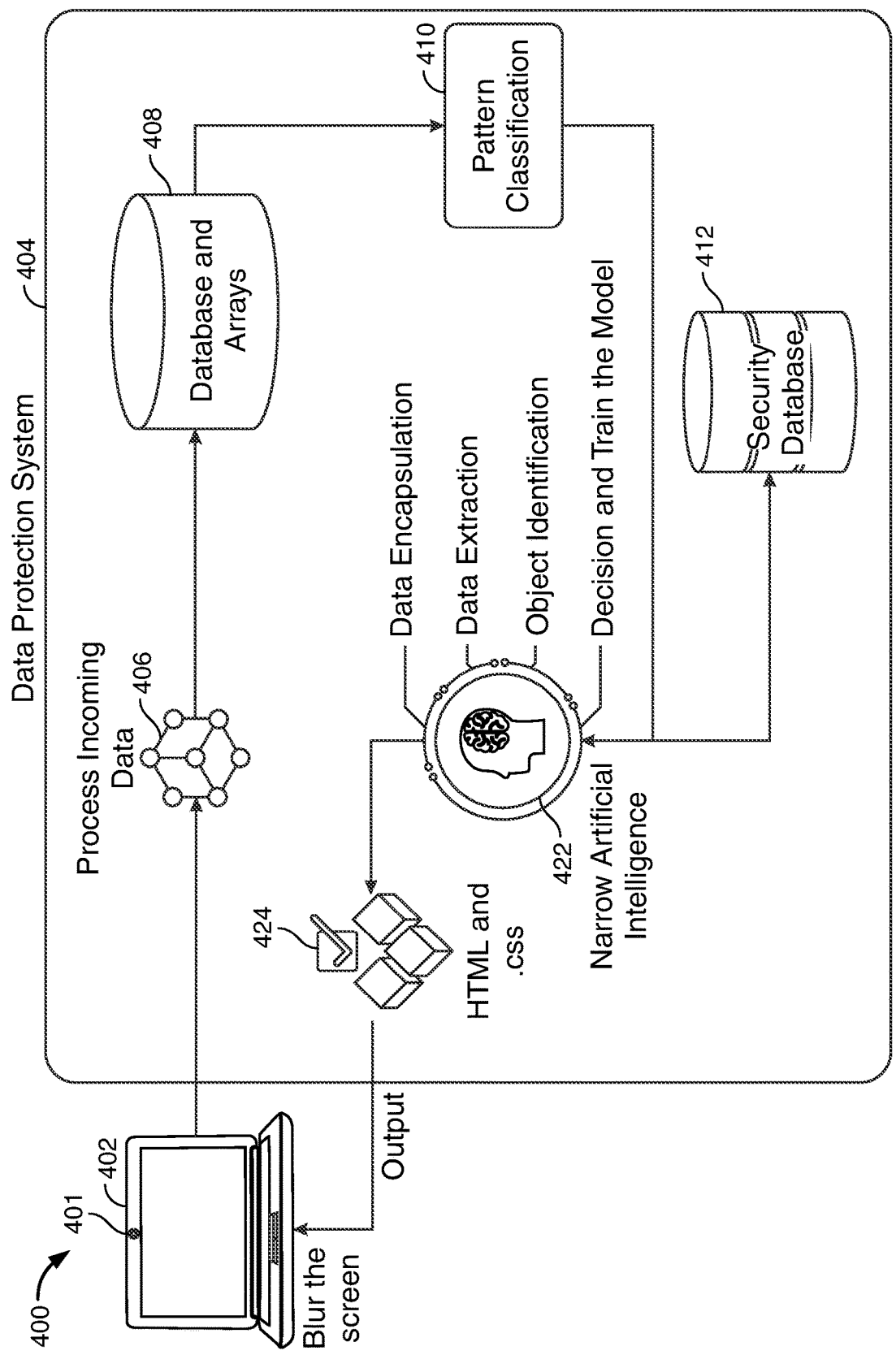
FIG. 4 shows yet another illustrative diagram in accordance with principles of the disclosure.

FIG. 4 shows illustrative process 400. Process 400 includes user computer 402. User computer may include one or more features in common with computer system 101 and user computer 304. User computer 402 may include camera 401. Camera 401 may capture live camera feed of data displayed on user computer 402. User computer 402 may transmit the live camera feed to data protection system 404.

Data protection system 404 may include data processor 406. Data processor 406 may process incoming data. Data processor 406 may extract significant data from the live camera feed. Data processor 406 may transmit the significant data to database 408. Database 408 may transmit the significant data to pattern classification model 410. Pattern classification model 410 may determine a signal. The signal may include data values identified from the significant data. Pattern classification model 410 may segment, classify and label the identified data values.

The labeled data segments may be transmitted from pattern classification model 410 to narrow AI model 422. Narrow AI model 422 may receive the data segments. Narrow AI model 422 may identify pixels corresponding to the data values. Narrow AI model 422 may combine the identified pixels to recreate the image of the data captured by camera 401. Narrow AI model 422 may identify confidential information included in the data. Narrow AI model 422 may store the confidential information in security database 412.

When narrow AI model 422 identifies confidential information, the confidential information may be blurred using hypertext markup language ("HTML") and cascading style sheets ("CSS") 424. The image with the blurred confidential data may be displayed on user computer 402.

Figure 5:
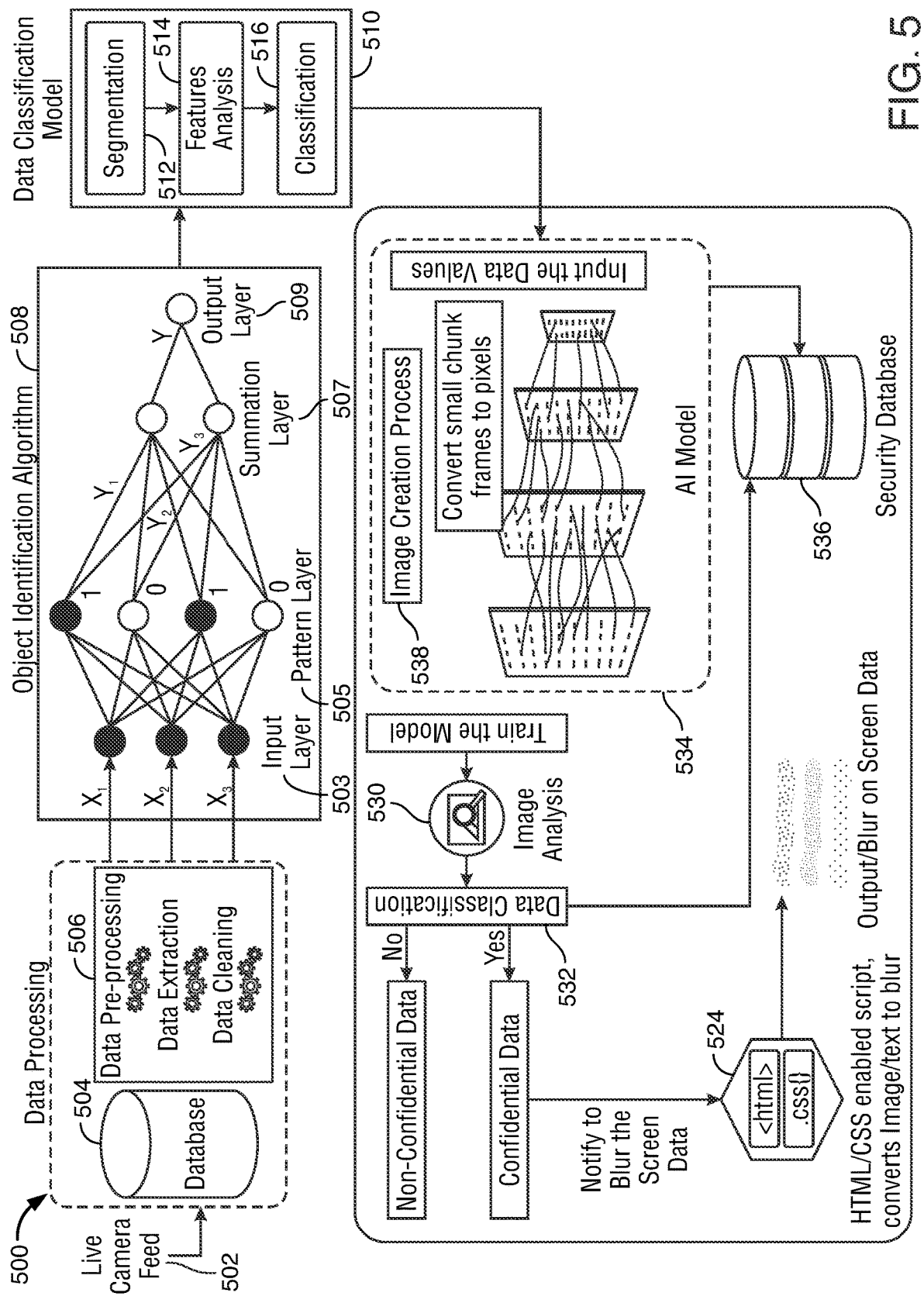
FIG. 5 shows yet another illustrative diagram in accordance with principles of the disclosure.

FIG. 5 shows illustrative process 500. Process 500 may include one or more features in common with process 400. Process 500 may include live camera feed 502. Live camera feed may be of a user computer. Live camera feed 502 may be transmitted to database 504. Database 504 may include processor 506. Processor 506 may preprocess data included in live camera feed 502. Processor 506 may extract significant data from the pre-processed data. Processor 506 may remove any malicious data from the extracted data.

Processor 506 may transmit the extracted data to object identification algorithm 508. Object identification algorithm 508 may include input layer 503. Input layer 503 may determine data values relating to the extracted data. Input layer 503 may transmit identified data values to pattern layer 505. Pattern layer 505 may determine correlations of the identified data signal characteristics. Pattern layer 505 may transmit the identified correlations to summation layer 507. Summation layer 507 may combine the identified correlations into one signal. Summation layer 507 may transmit the signal to output layer 509. Output layer 509 may transmit the signal to data classification model 510.

Data classification model 510 may include data segmentation 512. Data segmentation 512 may include segmenting the data values included in the output signal from object identification algorithm 508. Data classification model 510 may include feature analyzer 514. Feature analyzer 514 may include identifying data specific features for each data segment. Data classification model 510 may include classifier 516. Classifier 516 may label the data segments according to the identified data specific features. Data classification model 510 may transmit the labeled data segments to narrow AI model 534.

Narrow AI model 534 may input the labeled data segments. Narrow AI model 534 may extract the data values from the labeled data segments. Narrow AI model 534 may identify pixel values corresponding to the data values. Narrow AI model 534 may use the identified pixels for image creation process 538. Image creation process 538 may include grouping similar pixel values together to create pixel chunks. Image creation process 538 may include grouping pixel chunks to create pixel frames. Image creation process 538 may include grouping pixel frames to recreate the image of the data captured by live camera feed 502.

Narrow AI model 534 may be trained for image analysis 530. Image analysis 530 may include data classification 532. Data classification 532 may include determining whether the captured data includes confidential data of does not include confidential data. In response to determining that there is no confidential data in the captured data, narrow AI model 534 may enable the captured data to be displayed. In response to identifying confidential data in the captured data, narrow AI model 534 may store the confidential data at security database 536. In response to identifying confidential data in the captured data, narrow AI model 534 may send a notice to blur the confidential data. Narrow AI model 534 may use HTML and CSS 524 to blur the confidential data. After blurring the data, the recreated image may be displayed on the user computer screen.

Figure 6:
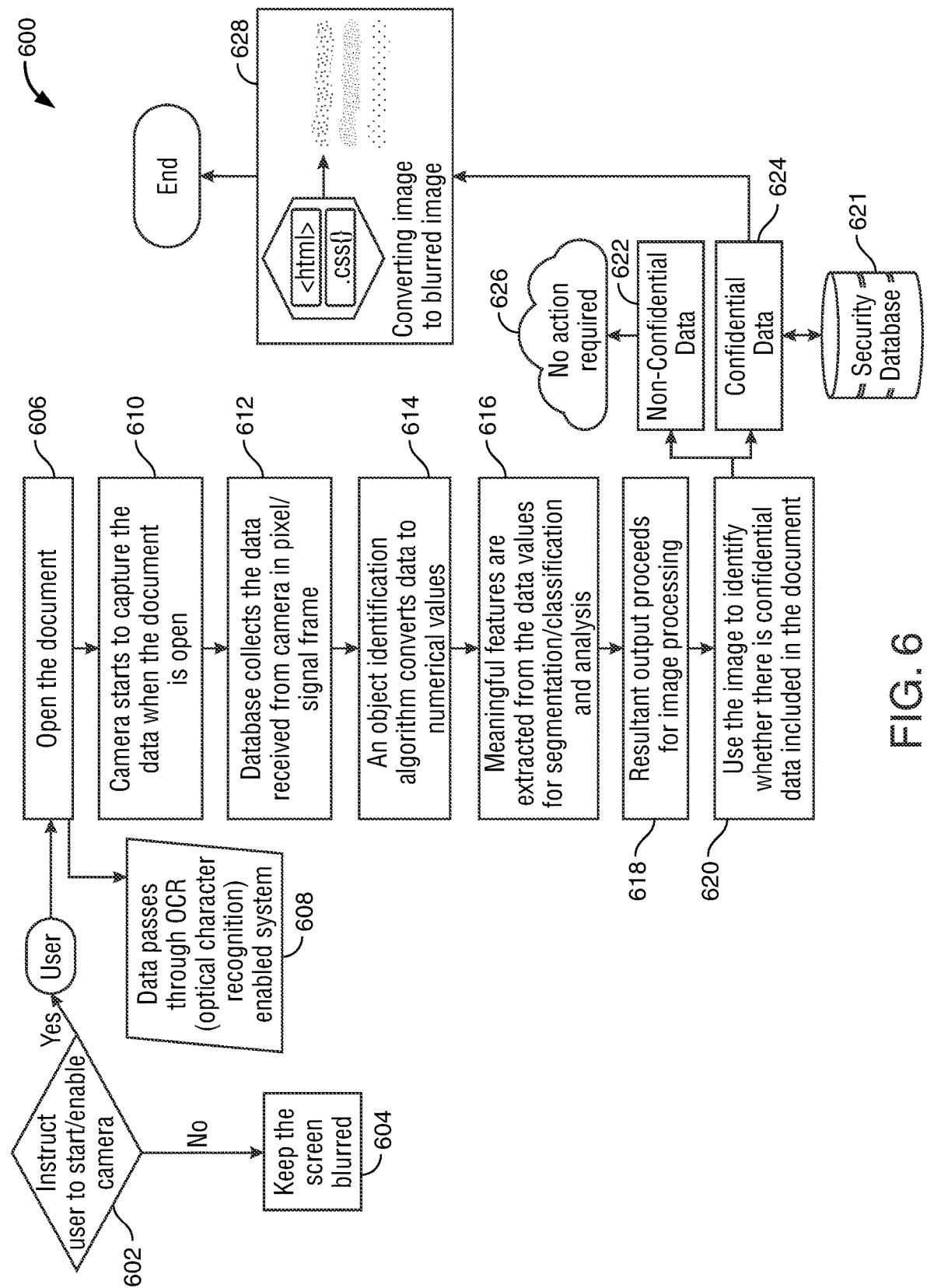
FIG. 6 shows still yet another illustrative diagram in accordance with principles of the disclosure.

FIG. 6 shows illustrative diagram 600. At step 602, a message may be transmitted to a user computer. The message may instruct the user to enable camera. If the user does not enable the camera, as shown at step 604, a screen of the user computer may be blurred. If the user enables the camera, the user may open a document as shown at step 606. Upon opening of the document, step 608 may be executed. At step 608, the data may be passed through an optical character recognition ("OCR") system. After the data passes through an OCR system, step 610 may occur. At step 610, the camera may start to capture data from the document. At step 612, the data may be collected by a database in a pixel/signal frame.

At step 614, an object identification algorithm may convert the data into numerical values. At step 616, meaningful features may be extracted from the data values. Meaningful features may include resolution, color, area detected, distance and/or any other suitable features relating to data values. The data values may be segmented, analyzed and classified according to the identified meaningful features. At step 618, the data values may be converted into an image. At step 620, the image may be used to identify confidential data in the document. When confidential data is not identified within the captured data, at step 622, than no action is performed, as shown at step 626. If confidential data is identified within the captured data, step 624 may be executed. Step 624 may include storing the confidential data at security database 621. After identifying confidential data, at step 628, the confidential data may be blurred and redisplayed on the user computer.

Thus, methods and apparatus for ON SCREEN DATA PROTECTION USING CAMERA AND NARROW ARTIFICIAL INTELLIGENCE are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for using narrow artificial intelligence ("AI") to detect and secure confidential data, the method comprising:

using a camera on a user computer screen to capture a live camera feed of an area in front of the user computer screen;

pre-processing the live camera feed by categorizing data captured in the live camera feed into categorized data;

identifying one or more unverified data elements in the categorized data using a machine learning algorithm;

determining a security-breach score for each unverified data element;

labeling each unverified data element with the determined security-breach score;

in response to determining that an unverified data element is labeled with a security-breach score that is greater than a predetermined security-breach score, securing the user computer screen, the securing comprising:

capturing a screenshot of the user computer screen;

extracting data from the screenshot;

transmitting the extracted data to an object identification algorithm, the object identification algorithm comprising:

an input layer for determining data values corresponding to the extracted data from the screenshot;

a pattern layer for determining a pattern of the data values;

a summation layer for determining an output signal for the pattern of data values; and an output layer for outputting the output signal to a data classification model, the data classification model comprising:

identifying pixel values corresponding to each of the data values;

segmenting the data values included in the outputted signal into segmented data values based on identified pixel values for each data value;

analyzing the segmented data values to identify data specific features for each data value segment; and labeling the data value segments according to the identified data specific features;

recreating the screenshot using a narrow AI model by:

inputting the labeled data value segments;

converting the data value segments into pixels; and combining the pixels to recreate the screenshot;

identifying confidential data within the screenshot using a pattern analysis model;

blurring the confidential data in the recreated screenshot; and overwriting the screenshot of the data displayed on the user computer screen to display the recreated screenshot.

2. The method of claim 1 further comprising:

maintaining the overwriting of the recreated screenshot when unverified data is detected by the camera; and removing the overwriting of the recreated screenshot when the camera fails to detect the unverified data.

3. The method of claim 1 further comprising:

capturing a video of a time period of activity on the user computer screen, the video comprising a plurality of screenshots, the video comprising screenshots of one or more of a plurality of documents, a plurality of applications and/or a plurality of folders;

recreating the video, the recreated video including blurred confidential data in each of the screenshots of one or more of the plurality of documents, the plurality of applications and/or the plurality of folders; and displaying the recreated video on the user computer screen.

4. The method of claim 1 wherein the one or more unverified data elements include an unauthorized user.

5. The method of claim 1 wherein the one or more unverified data elements includes artificial light.

6. The method of claim 1 further comprising, in response to detecting that the camera is disabled on the user computer screen, transmitting a message to the user computer screen, the message instructing a user of the user computer screen to enable the camera.

7. The method of claim 6 further comprising:

in response to detecting that the camera is disabled on the user computer screen, overwriting the user computer screen with a fully blurred image; and in response to detecting that the camera is enabled, removing the fully blurred image.

8. The method of claim 1 further comprising using hypertext markup language ("HTML") and cascading style sheets ("CSS") to blur the confidential data.

9. An apparatus for using narrow artificial intelligence ("AI") to detect and secure confidential data, the apparatus comprising:

a processor, operating in tandem with a user computer, said user computer being connected to a camera, the camera operable to capture live camera feed in a space adjacent to the user computer, the processor configured to:

pre-process the live camera feed by categorizing data captured in the live camera feed into categorized data;

identify one or more unverified data elements in the categorized data;

determine a security-breach score for each unverified data element, label each unverified data element with the determined security-breach score;

secure the user computer in response to a determination that an unverified data element is labeled with a security-breach score that is greater than a predetermined security-breach score;

capture a screenshot of a screen of the user computer; and extract data from the screenshot;

an object identification algorithm configured to:

receive the extracted data from the processor; and transmit an output signal including data values identified in the screenshot;

a data classification model configured to;

receive the output signal from the object identification algorithm;

identify a corresponding pixel value for each data value;

segment the data values included in the output signal into segmented data values based on identified pixel values for each data value;

analyze the segmented data values to identify data specific features for each data value segment; and label the data value segments according to the identified data specific features; and a narrow AI model configured to;

receive the labeled data value segments from the data classification model;

convert the data value segments into pixels;

combine the pixels to recreate the screenshot;

identify confidential data within the data using a pattern analysis model;

blur the confidential data in the recreated screenshot; and overwrite the screenshot of the data displayed on the screen of the user computer to display the recreated screenshot.

10. The apparatus of claim 9 wherein the narrow AI model is further configured to:

maintain the overwrite of the recreated screenshot when unverified data is detected by the camera; and remove the overwrite of the recreated screenshot when the camera fails to detect the unverified data.

11. The apparatus of claim 9 wherein the processor is further configured to capture a video of a time period of activity on the user computer, the video comprising a plurality of screenshots, the video comprising screenshots of one or more of a plurality of documents, a plurality of applications and/or plurality of folders.

12. The apparatus of claim 11 wherein the narrow AI model is further configured to:

recreate the video, the recreated video including blurred confidential data in each of the screenshots of one or more of the plurality of documents, the plurality of applications and/or the plurality of folders; and display the recreated video on the screen of the user computer.

13. The apparatus of claim 9 wherein the one or more unverified data elements includes an unauthorized user.

14. The apparatus of claim 9 wherein the one or more unverified data elements includes artificial light.

15. The apparatus of claim 9 wherein the processor is further configured to transmit a message to the user computer instructing a user of the user computer to enable the camera in response to a detection that the camera is disabled on the user computer.

16. The apparatus of claim 15 wherein the narrow AI model is further configured to:

overwrite the user computer with a fully blurred image in response to detecting that the camera is disabled; and remove the fully blurred image in response to detecting that the camera is enabled.

17. A method for using narrow artificial intelligence ("AI") to detect and secure confidential data, the method comprising:

using a camera on a user computer screen to capture a live camera feed of an area adjacent of the user computer screen;

pre-processing the live camera feed by categorizing data captured in the live camera feed;

identifying one or more unverified data elements in the categorized data;

determining a security-breach score for each unverified data element;

labeling each unverified data element with the determined security-breach score; and in response to determining that an unverified data element is labeled with a security-breach score that is greater than a predetermined security-breach score, securing the user computer screen, the securing comprising:

capturing a screenshot of the user computer screen;

extracting data from the screenshot;

transmitting the extracted data to an object identification algorithm, the object identification algorithm outputting an output signal including data values identified in the screenshot;

recreating the screenshot using a narrow AI model by:

converting the data values into pixels; and combining the pixels to recreate the screenshot;

identifying confidential data within the screenshot using a pattern analysis model;

blurring the confidential data in the recreated screenshot; and displaying the recreated screenshot on the user computer screen.

18. The method of claim 17 further comprising using an image recognition algorithm to detect unverified data elements by comparing data captured in the live camera feed to a stored facial recognition profile of a user of the user computer screen.

19. The method of claim 18 the method further comprising:

detecting an unverified user on the camera;

capturing a facial recognition profile of the unverified user; and comparing the facial recognition profile of the unverified user with the facial recognition profile of the user.

20. The method of claim 19 further comprising when the facial recognition profile fails to be similar, over a threshold of similarity, with the stored facial recognition profile of the user:

labeling the unverified user as an unverified data element; and storing the facial recognition profile of the unverified user as a unverified data element.

* * * * *